(12) United States Patent
Gerhart et al.

(10) Patent No.: US 11,126,357 B2
(45) Date of Patent: Sep. 21, 2021

(54) INTELLIGENT SAS PHY CONNECTION MANAGEMENT

(71) Applicant: Western Digital Technologies, Inc., San Jose, CA (US)

(72) Inventors: Darin Edward Gerhart, Oronoco, MN (US); Nicholas Edward Ortmeier, Rochester, MN (US); Mark David Erickson, Mantorville, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/831,729

(22) Filed: Mar. 26, 2020

(65) Prior Publication Data

US 2020/0225860 A1    Jul. 16, 2020

Related U.S. Application Data

(62) Division of application No. 15/947,669, filed on Apr. 6, 2018, now Pat. No. 10,642,519.

(51) Int. Cl.
*G06F 3/06* (2006.01)
*G06F 1/3225* (2019.01)
*G06F 13/28* (2006.01)

(52) U.S. Cl.
CPC .......... *G06F 3/0634* (2013.01); *G06F 1/3225* (2013.01); *G06F 3/0653* (2013.01); *G06F 3/0659* (2013.01); *G06F 13/287* (2013.01); *G06F 3/0611* (2013.01)

(58) Field of Classification Search
None
See application file for complete search history.

(56) References Cited

U.S. PATENT DOCUMENTS

| | | |
|---|---|---|
| 7,673,185 B2 | 3/2010 | Kalwitz et al. |
| 8,327,193 B2 | 12/2012 | Enarson et al. |
| 8,332,578 B2 | 12/2012 | Frickey, III et al. |
| 8,843,666 B2 | 9/2014 | Besmer et al. |
| 8,924,751 B2 | 12/2014 | Myrah et al. |
| 8,959,374 B2 | 2/2015 | Miller et al. |
| 10,379,747 B2 | 8/2019 | Erickson et al. |
| 2005/0021885 A1 | 1/2005 | Anderson et al. |
| 2005/0076162 A1 | 4/2005 | Tamura et al. |
| 2007/0028062 A1 | 2/2007 | Radhakrishnan et al. |
| 2007/0093124 A1 | 4/2007 | Varney et al. |
| 2009/0150894 A1 | 6/2009 | Huang et al. |
| 2010/0153656 A1 | 6/2010 | Yoshikawa |
| 2010/0174849 A1 | 7/2010 | Walston et al. |
| 2011/0087913 A1* | 4/2011 | Robles .............. G06F 1/325 713/330 |

(Continued)

OTHER PUBLICATIONS

Technical White Paper; HP Smart Storage for HP ProLiant Geb9 Servers; dated 2014 (14 pages).

*Primary Examiner* — Scott C Sun
(74) *Attorney, Agent, or Firm* — Patterson & Sheridan LLP; Steven H. Versteeg

(57) ABSTRACT

A method and apparatus that provides a solid state drive that analyzes connection performance during I/O operations and is configured to independently modify connection performance based upon user specified input parameters without the need for host computer management.

20 Claims, 7 Drawing Sheets

(56) References Cited

U.S. PATENT DOCUMENTS

| | | |
|---|---|---|
| 2011/0320708 A1* | 12/2011 | Otaka .................. G06F 3/0659 |
| | | 711/114 |
| 2012/0324146 A1 | 12/2012 | Marks et al. |
| 2013/0124932 A1 | 5/2013 | Schuh et al. |
| 2013/0159449 A1 | 6/2013 | Taylor et al. |
| 2014/0181585 A1 | 6/2014 | Hoang et al. |
| 2014/0215103 A1 | 7/2014 | Cohen et al. |
| 2014/0337562 A1 | 11/2014 | Long et al. |
| 2014/0359204 A1 | 12/2014 | Yoo et al. |
| 2016/0239458 A1 | 8/2016 | Varchavtchik et al. |
| 2017/0115904 A1 | 4/2017 | Hashimoto |
| 2017/0133011 A1 | 5/2017 | Chen et al. |
| 2017/0255414 A1 | 9/2017 | Gerhart et al. |
| 2017/0359272 A1 | 12/2017 | Srinivasan et al. |
| 2018/0173293 A1 | 6/2018 | Erickson et al. |
| 2018/0321854 A1* | 11/2018 | Lai ............................ G06F 8/65 |

* cited by examiner

SAS PHY CONNECTION MANAGEMENT CONFIGURATION PARAMETERS

| BYTE | BIT 7 | 6 | 5 | 4 | 3 | 2 | 1 | 0 |
|---|---|---|---|---|---|---|---|---|
| 0-1 | MINIMUM PERSISTENT CONNECTION TIME (µs) | | | | | | | |
| 2 | RESERVED | | | | SPCM CONNECTION MODE | | | |
| 3 | DONE DELAY THRESHOLD (100µs) | | | | | | | |

FIG. 4

INTELLIGENT SAS PHY CONNECTION MANAGEMENT

CROSS-REFERENCE TO RELATED APPLICATIONS

This application is a divisional of co-pending U.S. patent application Ser. No. 15/947,669, filed Apr. 6, 2018, which is herein incorporated by reference.

FIELD OF THE DISCLOSURE

Aspects of the disclosure relate to memory arrangements or devices used with computer devices. More specifically, aspects of the disclosure relate to smart memory devices that may be used with a host, such as a computer, to control latency, physical connections and performance of the memory arrangement.

BACKGROUND INFORMATION

Field

Device operational parameters are an increasingly important aspect for computer arrangement users. Recent changes in complexity of devices used in computer arrangements provide opportunities for component manufacturers to provide features heretofore unknown to enhance the operation of the computer arrangement.

Data storage and retention is becoming an increasingly complex and technologically advanced portion of computing platforms. Conventional memory arrangements, at one time, were rudimentary storage devices. As computing platforms have become more complex, however, data storage devices are being required to perform greater numbers of tasks.

Speed of operation has become one factor in which computer manufacturers try to distinguish themselves over their respective competition. Component manufacturers, therefore, are required to respond to increasing demands of the computer manufacturers to enable the overall user platform expectations. The vastly increased demands by the computer manufacturers has led component manufacturers, such as solid state drive manufacturers, to increase the complexity of their respective designs.

Solid state drive manufacturers must account for different operating environments and connections that are attached to their respective solid state drives. Differing numbers of physical connections may be performed, with each physical connection impacting the overall operation of the drive.

Conventional technology requires that a host, such as a host computer arrangement, identify the connections to different components, such as a solid state drive, and manage these connections based upon different parameters. Conventional technology, however, does not accurately predict or efficiently manage the connections. Connection adjustments are not typically made during active use and are often relegated to being performed at relative times of inactivity for the computer. The user, therefore, uses the computer when in a non-optimal state.

In certain instances, reestablishing connections, such as Serial Attached SCSI "SAS" connections between data transfers can result in a decrease in the SAS link efficiency. SAS persistent connections provide a mechanism to extend open connections indefinitely, avoiding the overhead to re-open the same connection in the future.

For the purposes of definition, the term "phy" refers to the physical layer of a computer circuit. A "phy connection", is a connection to a physical layer of a computer circuit. Optimal SAS phy connection management complexity increases with the number of phys in the device, use of wide ports and independent phy power management.

There is also a need to provide a memory arrangement, such as a solid state drive, that manages the physical connections directly made to the drive, without the need for a computer host.

There is also a need to provide a solid state drive that will accurately predict future operations to the solid state drive to allow the drive to enter optimal operational configurations in a quick and efficient manner.

There is also a need to provide a solid state drive that will be cost effective to manufacture.

There is also a need to provide a solid state drive that may be arranged and operated such that individual customer needs are taken into account to allow the customer to obtain an optimal user experience related to the solid state drive.

There is a further need to provide a solid state drive that will efficiently change operating states, monitor the operating states, and monitor transition states so that the monitored data may be used beneficially.

SUMMARY

The following summary, while providing example embodiments and methods, should not be considered limiting of the aspects of the disclosure.

In one non-limiting embodiment, an arrangement for phy connection management is disclosed comprising: at least one phy connection configured to be connected to an electrical circuit and transmit and receive data from the at least one phy connection, a SAS phy connection manager connected to each of the at least one phy connections, wherein the SAS phy connection manager is configured to control a connection of the at least one phy connection to the electrical circuit and wherein the SAS phy connection manager is configured to capture data related to initiator requests, a direct memory access multiplexer connected to the at least one phy connection to transmit and receive data and a direct memory access engine queue connected to the direct memory access multiplexer.

In another non-limiting embodiment, a method for operating at least one phy connection in a memory arrangement is disclosed comprising: obtaining at least one set of data from the at least one phy connection, transmitting the at least one set of data from the at least one phy connection to a SAS phy connection manager, adjusting at least one phy connection parameter with the SAS phy connection manager; and connecting the at least one phy connection to an electrical circuit using the at least one phy connection parameter adjusted by the SAS phy connection manager.

In another non-limiting embodiment, an arrangement for intelligent SAS phy connection management is disclosed comprising means for obtaining at least one set of data from the at least one phy connection, means for transmitting the at least one set of data from the at least one phy connection to a SAS phy connection manager and means for adjusting at least one phy connection parameter with the SAS phy connection manager.

In another non-limiting embodiment, a method for operating a phy connection in a memory arrangement is disclosed comprising: obtaining data from the phy connection, transmitting the data from the phy connection to a SAS phy connection manager, determining operating parameters for the phy connection; adjusting at least one phy connection operating parameter with the SAS phy connection manager, and connecting the phy connection to an electrical circuit using the at least one phy connection operating parameter adjusted by the SAS phy connection manager.

In another non-limiting embodiment, a method of operating a SAS phy connection in a solid state drive is disclosed comprising obtaining data from the phy connection, transmitting the data from the phy connection to a SAS phy connection manager wherein the data contains data related to a request to open a persistent phy connection, evaluating, with the SAS phy connection manager, whether a persistent phy connection is to be established for the solid state drive and opening a persistent phy connection based upon the SAS phy connection manager evaluation.

In another non-limiting embodiment, a method of operating a SAS phy connection in a solid state drive is disclosed comprising obtaining data from at least two phy connections, transmitting the data from the phy connection to the SAS phy connection manager wherein the data contains data related to a request to open a persistent phy connection, evaluating, with the SAS phy connection manager, whether the persistent phy connection is to be established to at least one of the at least two phy connections and opening the persistent phy connection based upon the SAS phy connection manager evaluation.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a SAS phy connection management configuration parameter.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects described allow for a memory arrangement, such as a solid state drive, to control parameters of the solid state drive to monitor, maintain and/or alter physical connections that are provided with the solid state drive. Aspects provided allow for the control of the physical connections, monitoring of those physical connections and alteration of those physical connections without the need for a host computer to interface with the solid state drive.

In embodiments provided, the solid state drive may monitor functions of the memory arrangement in order to determine the most efficient modes of operation of the solid state drive. These embodiments may also use predictive analysis to enable the solid state drive to predict future uses of the memory arrangement, therefore allowing for efficient use of the solid state drive in future operations.

As the future operations may include different types of activities, the solid state device may enter one of a plurality of modes of operation that are predefined for the drive. These modes of operation specifically allow for different types of functions to be performed while the solid state drive is in that specific mode. The modes, as discussed later, have certain advantages of operation, therefore entry of the specific modes enables a better operational capability for a user. As a non-limiting example, some modes of operation may allow for power saving functions for the solid state drive, thereby allowing the solid state drive to be independently operational for long periods of time. In other modes of operation, operational performance is more important compared to power saving capabilities, therefore searching and retrieving data capabilities are maximized compared to the power saving capabilities.

Figure 1:
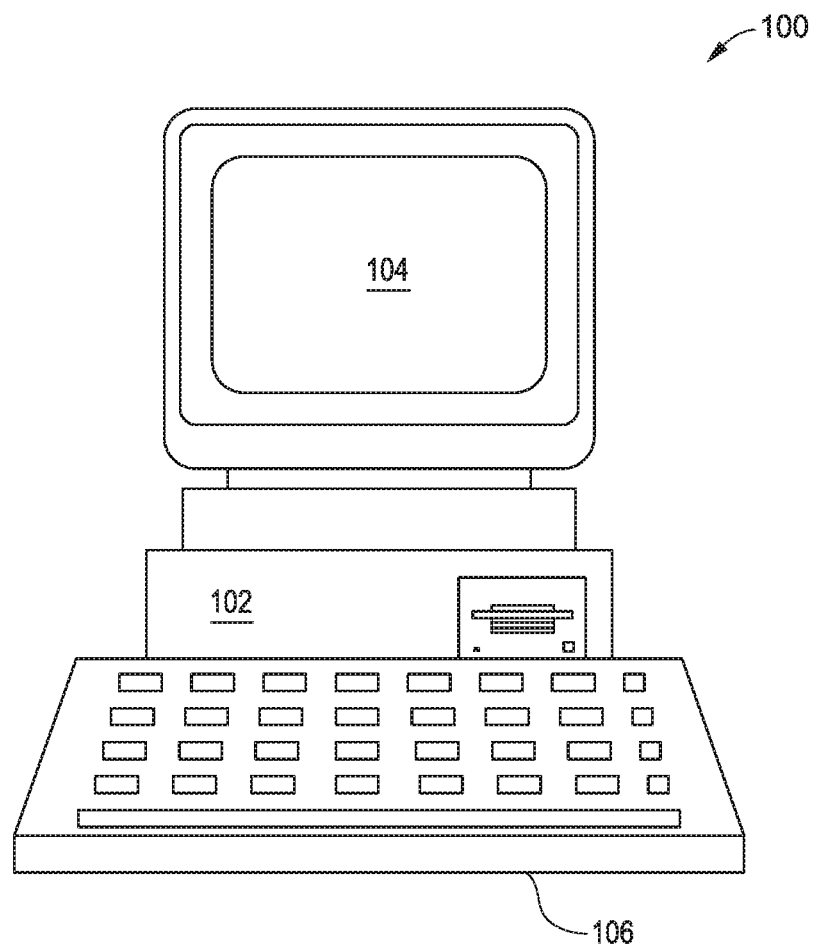
FIG. 1 is an overall plan view of a computer device that uses a solid state drive.

Referring to FIG. 1, a computer arrangement 100 is illustrated. The computer arrangement 100 has several different components that enhance the operation of the computer arrangement 100. Data may be recorded, stored and retrieved in a memory arrangement, such as a solid state drive (SSD) 102. The solid state drive 102 may have any manner of data stored upon the drive 102 to enable either the computer to operate efficiently, or store for future use by a user. A monitor 104 is provided as an output device to visually depict the processes being accomplished by the computer arrangement 100. An input device, such as a keyboard 106, is also provided for input of data to the computer arrangement 100. Aspects of the solid state drive 102 are described below, wherein the arrangements and methods described provide for operational capabilities that are not achievable by conventional memory arrangements.

A host, such as the computer arrangement 100, does not have visibility to a devices usage of phys, for example the connection to the physical layer of a SSD 102. The device, such as the SSD 102 itself determines the order and timing of data transfers on each phy based on internal scheduling statistics and power vs. performance preferences. Multi-initiator environments may result in multiple connections based on command reordering. A device may select a specific phy for read direction host transfers and data requests for write direction host transfers in wide port configurations. As such, the device may initiate phy power state transitions based on internal command scheduling.

SAS standards do not define a device specific SAS phy connection management implementation. In aspects provided herein, phy connection management may be provided to enable superior usage capabilities compared to conventional technologies. In embodiments herein, based on internal phy usage knowledge and customer configuration controls, drives, for example, have an opportunity to provide an intelligent device connection management to govern phy power and input/output ("I/O") performance tradeoffs. As described later, a user may select or preconfigure a setting that alters the SSD performance or power saving aspects of device, effectively providing the user with a choice between SSD I/O performance or power efficiency. Different levels of performance and power saving capabilities may be chosen.

In embodiments described herein, the solid state drive may provide power or latency advantages over conventional units based on customer input and internal statistics. Persistent connections between the solid state drive and a host, for example, may be optimized. These connections may be managed for multiple initiators that share a narrow port based on initiator response time statistics. In embodiments, if a host tries to establish a persistent connection to the solid state drive, attempts may be rejected by the drive if the phy is needed by a different initiator. Persistent connections may be established that are opportunistic in nature where the phy is needed for a different initiator at a time in the future by extending persistent connections with a first initiator for a duration just prior to when the phy is needed by the second initiator. Additional advantages may be provided when early termination of persistent connections is needed to allow other initiator connections on narrow ports, wide port cases or in cases of power management needs. Embodiments described herein also allow for the solid state device to delay or selectively delay a "done" primitive sent to a host by the solid state drive if the drive is not completed with tasks, such as retrieving data from flash. In still further embodiments, connections may be initiated before host data transfers are ready to eliminate/minimize connection time latency from command execution times.

Figure 2:
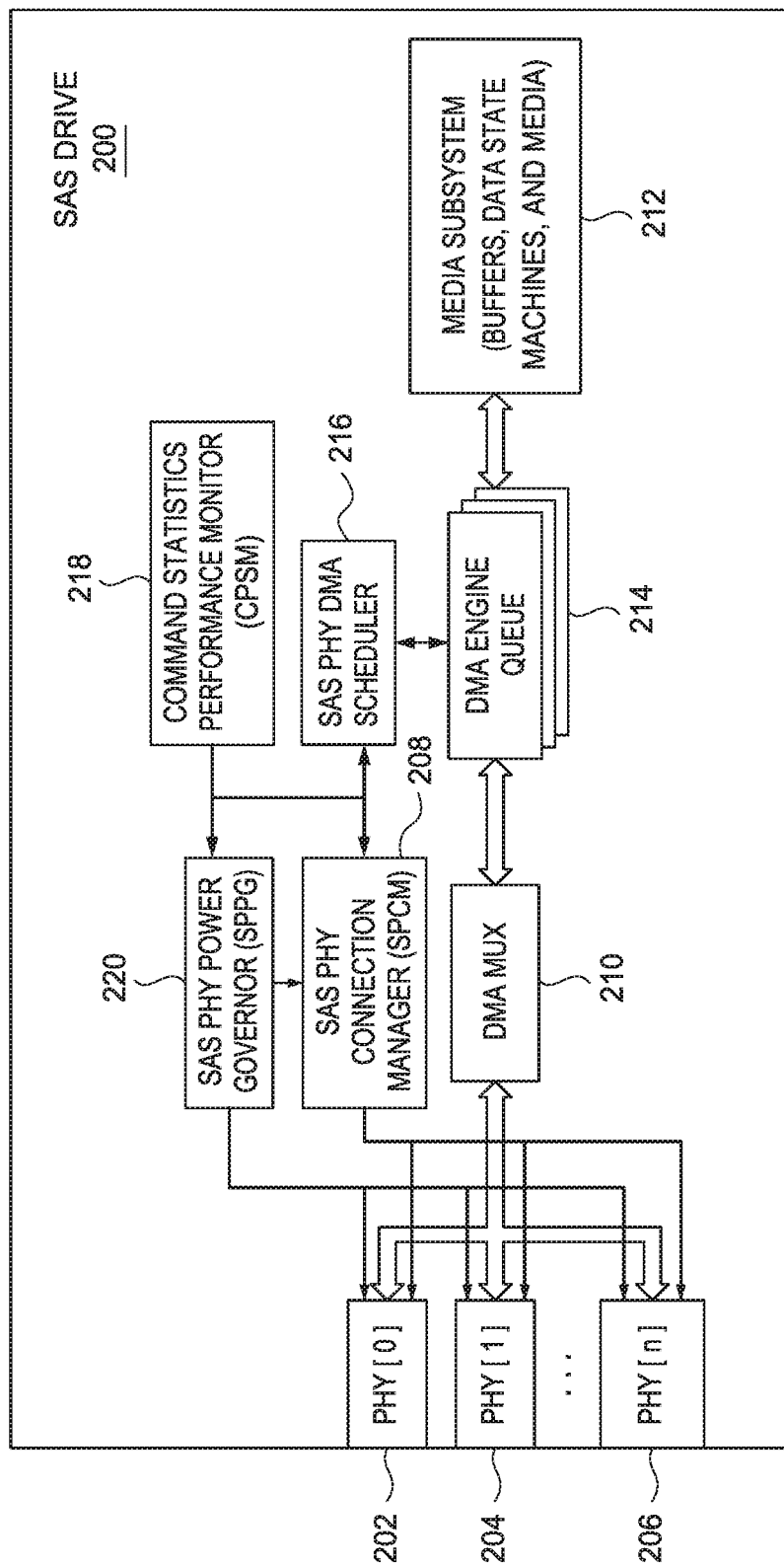
FIG. 2 is a schematic view of a SAS drive.

Referring to FIG. 2, a SAS drive 200 is illustrated. SAS phy connections, such as phy[0] 202, phy[1] 204 . . . phy[n] 206 are managed within the drive 200 through a SAS phy connection manager (SPCM) 208. A direct memory access "DMA" multiplexer 210 allows for interconnection of the phy[0] 202, phy[1] 204 and phy[n] 206 to media subsystems 212, such as buffers, media, and data state machines, through a direct memory access engine queue 214. A SAS Phy DMA scheduler 216 provides scheduling information to the DMA Engine queue 214. A command statistics performance monitor CPSM 218 performs monitoring functions of the SAS phy DMA scheduler 216, the SAS Phy Connection Manager (SPCM) 208 and a SAS Phy Power Governor (SPPG) 220. The SPCM 208 manages SAS phy connection state transitions. As inputs, the SPCM 208 may use phy port configurations, for example if the port is defined as narrow or wide. As an example, a wide port may consist of 4 phy connections, while a narrow port consists of a single phy connection. As additional inputs, the SPCM 208 may use a current phy connection state, phy usage queues from the SAS phy DMA scheduler 216, SPPG Power Management (PM) state transitions from the SPPG 220 and CPSM initiator connection statistics from the CPSM 218.

The SPCM 208 also has monitoring capabilities for monitoring SAS connection states of various components. The SPCM 208 monitors power save states, wherein connections may be delayed due to latencies from low power recovery. The SPCM 208 may also monitor idle connections (where there is no active connection to a phy), a connecting state (in process of opening a connection), a disconnecting state (in process of closing a connection), an active state (host data transfer capable state), an active persistent connection state (a persistent connection is established) and a disconnect delay state (where a "done" primitive is withheld from being sent from the SSD Phy until a delay timer is satisfied).

The SPCM 208 is also configured to manage the SAS phy state transitions, such as requesting a "done" primitive, requesting a "close" primitive as well as withholding a "done" or "close" primitive.

Figure 3:
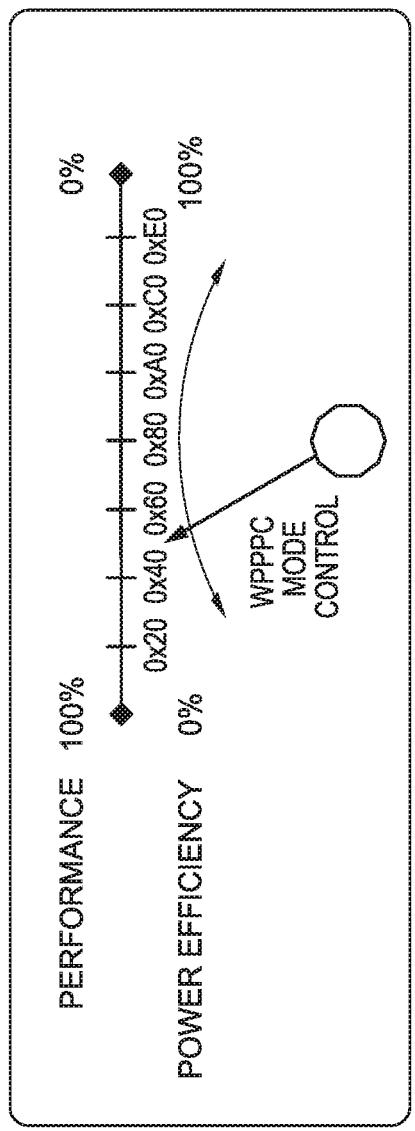
FIG. 3 is a schematic view of a SPCM customer configuration control.

Referring to FIG. 3, a diagram illustrating performance vs. power efficiency configuration control is illustrated. A wide port performance power control (WPPPC) provides control over performance vs. power efficiency input factors. The WPPPC provides a common mode page control as an input for SAS phy usage selection, SAS phy power governor decisions, and SAS phy connection management. The WPPPC specifies a weight of performance factor vs. power efficiency factor in the SPCM algorithms as shown in the following examples:
- 0=0% power weight, 100% performance weight, specifies that the SPCM 208 make decisions based entirely on the lowest latency impacts
- 0)(40=25% power weight, 75% performance weight, specifies that the SPCM 208 uses 25% weight on the lowest power and 75% weight on lowest latency
- 0x80=50% power weight, 50% performance weight, specifies that the SPCM 208 use equally weighted factors for lowest power and lowest latency
- 0xC0=75% power weight, 25% performance weight, specifies that the SPCM 208 uses 75% weight on lowest power and 25% weight on lowest latency
- 0xFF=100% power weight, 0% performance weight, specifies that the SPCM 208 be entirely configured based on lowest power.

Control is provided through a vendor unique mode page byte. A dynamic customer configuration is selected and adjusted by a customer through mode select commands. In another embodiment, a static customer configuration may be configured as a customer unique firmware per customer preference when the solid state drive is provided to a user.

Referring to FIG. 4, a SPCM Configuration mode parameter is illustrated. The SPCM has specific configuration mode parameters that comprise the following control fields. A minimum persistent connection time that specifies a minimum amount of time the SPCM should maintain a persistent connection where:
- 0=0xFFFE specifies a minimum persistent connection time value in micro-seconds (us)
- 0xFFFF: special value that specifies that SPCM should treat the minimum persistent connection time as though it was infinite amount of time A SPCM connection mode parameter is provided wherein the field reflects the current SPCM mode where:
- 0=SPCM normal mode—default behavior of the SPCM
- 1=SPCM speculative mode—the SPCM extends connections with the host by withholding a done primitive to allow for additional connection use if more data becomes available.
- 3 to 15=Additional modes that are reserved for future use.

A SPCM done delay threshold mode parameter is provided wherein the field specifies the amount of time SPCM should extend connections by withholding the done primitive while a phy is in the disconnect delay state. The done delay threshold mode parameter is specified in units of time, where the units of time could 10 us, 100 us, or 1 ms increments. In the example in FIG. 4, the done delay threshold mode parameter is specified in 100 us units of time.

In the illustrated embodiment, the host is allowed to configure SPCM behavior. The mode fields can be updated dynamically via mode select command. The mode fields may also be statically configured in a customer unique firmware. Referring to FIG. 4, the minimum persistent connection time, in microseconds, is placed on bytes 0-1 along bits 0 thorough 7. The CPSM connection mode is located in byte 2, along bits 0 to 3 and the done delay threshold in values of 100 microseconds in byte 3 along bits 0 to 7.

Figure 5:
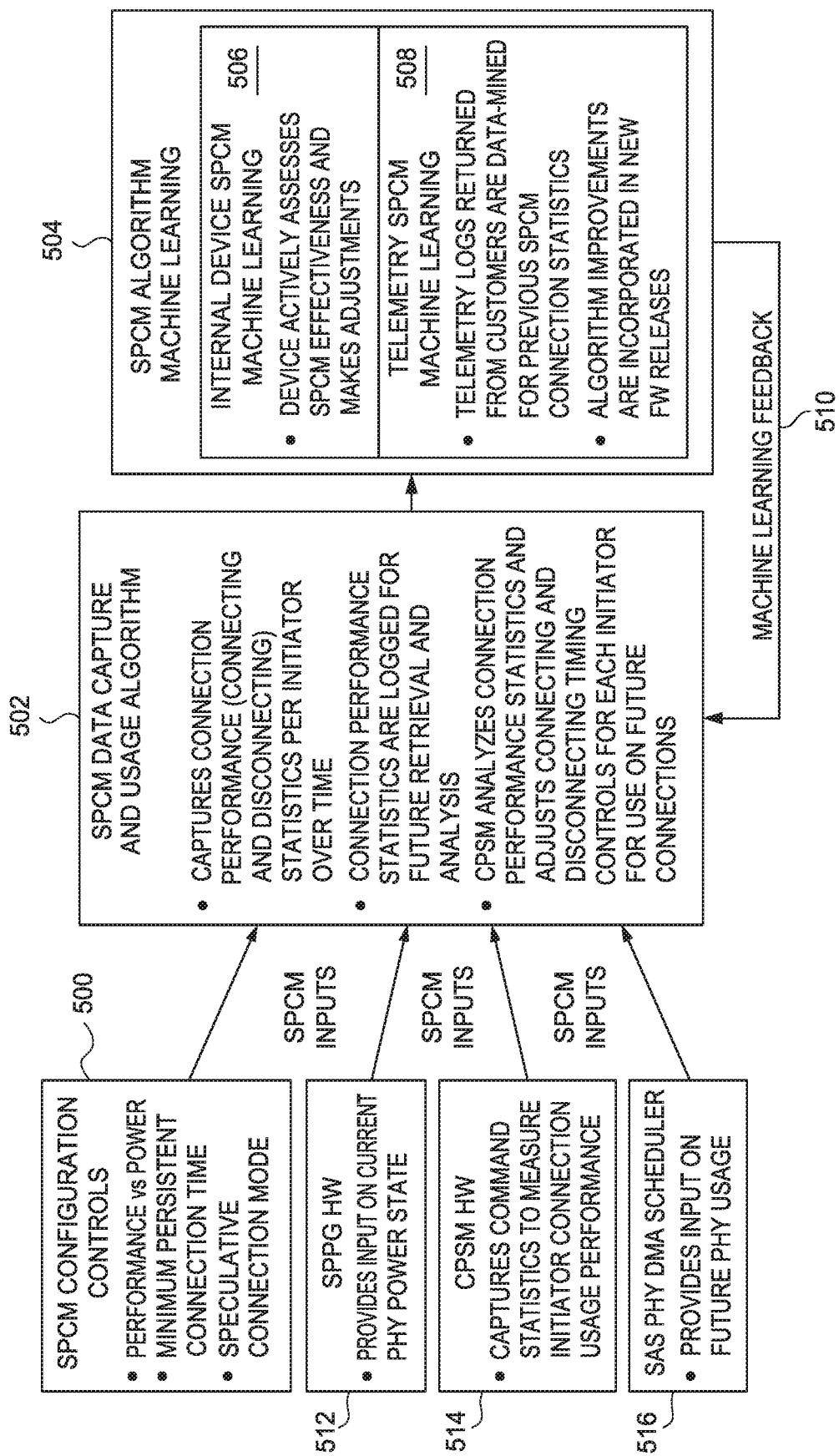
FIG. 5 is a SAS phy connection management block diagram.

Referring to FIG. 5, a SAS phy connection management block diagram is illustrated. In element 500, SPCM configuration controls are illustrated that control performance vs. power attributes, a minimum persistent connection time, and a speculative connection mode. The SPPG HW 512 provides input on the current phy power state. The CPSM HW 514 provides input on initiator connection usage performance. The SAS phy DMA scheduler 516 provides input on future SAS phy usage. These inputs from SPCM configuration controls 500, SPPG HW 512, CPSM HW 514, and SAS phy DMA scheduler 516 are provided to a SPCM data capture and usage algorithm 502 that captures connection performance statistics per initiator for both connecting and disconnecting state transitions, logs these connection performance statistics for future retrieval, analyzes the connection performance statistics, and adjusts connecting and disconnecting timing controls per initiator for use on future connections with the respective initiator.

Further referring to FIG. 5, the SPCM data capture and usage algorithm 502 provides results to a SPCM algorithm machine learning arrangement 504. Within the arrangement 504, an internal device SPCM machine learning 506 is provided wherein the device actively assesses SPCM effectiveness and makes adjustments. In 508 an arrangement for telemetry SPCM machine learning is provided. The arrangement in 508 provides for telemetry logs returned from customers which are data mined for previous SPCM connection statistics. Algorithm improvements may be provided within the arrangement 508 in new firmware releases. A machine learning feedback loop 510 provides updates back to the SPCM algorithm 502. The algorithm 502 may be provided in a dedicated ASIC or processor, for example.

Figure 6:
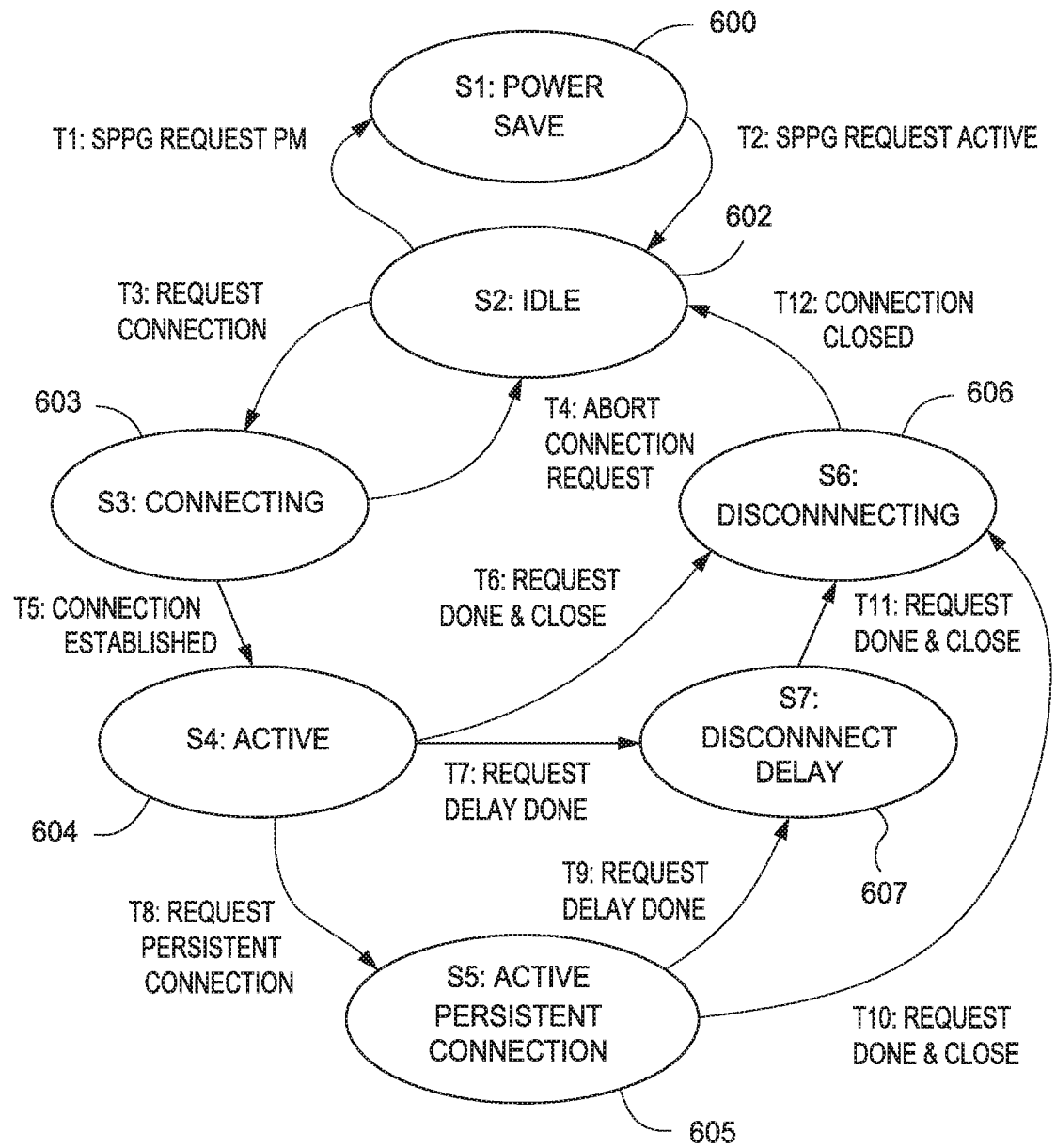
FIG. 6 is a SPCM state machine with differing states and transitions.

Referring to FIG. 6, a SPCM state machine with states and transitions is illustrated. The SPCM has a responsibility of actively monitoring phy and systems status. The SPCM manages phy connection states and may request phy connection state transitions as necessary to ensure phys are in an optimal state for best performance or power utilization. In 600, a power save state (S1) is provided. The phy state is managed by the SPPG where the phy is in an active power management state and wakes up prior to establishing a connection. In the power save state S1, the SPCM does not actively manage power management states.

Referring to FIG. 6, an idle state S2 602 is provided. The SPCM monitors several aspects. A Phy Expected Access Time (PhyEAT) calculates the expected time until phy usage is provided by the SAS Phy DMA Scheduler input. A Phy connection time (PhyCT) is monitored. This value is the amount of time that it takes to establish a connection on this phy to the target initiator based on internal statistics from past connections and current link usage. The SPCM further monitors a Phy Initiate Connection Time (PhyICT). This is the optimal time when the SPCM should initiate a request to establish a connection such that the phy is in an active state when it is needed for a host data transfer (e.g. PhyICT=PhyEAT-PhyCT where any negative result is set to 0). The SPCM also monitors for any host requests for state transitions that may be independent to SPCM initiated requests.

The SPCM manages state transitions. As an example, while the PhyICT>0 and there are no SPPG requests for Phy Power Management (PM), SPCM continues to monitor and update SPCM variables. If the SPPG request PM, then a transition is initiated to the power save state S1. When the PhyICT=0, a phy connection request may be initiated.

Further referring to FIG. 6, a connecting state, S3, 603 is provided. In this state, the SPCM is actively attempting to establish a connection to an initiator. The SPCM monitors the following: a phy connection progress (e.g. awaiting OPEN_ACCEPT, OPEN_REJECT, timeout). SPCM monitors the PhyEAT for any changes from the SAS Phy DMA Scheduler for when a phy may be needed (e.g. increase in PhyEAT, aborted request for transfer). SPCM also monitors The PhyICT to determine an optimal time when the SPCM should initiate a request to establish a connection such that the phy is in an active state when it is needed for host data transfer (e.g. PhyICT=PhyEAT-PhyCT). The SPCM also monitors any host requests for state transitions that may be independent to the SPCM initiated requests.

The SPCM may manage state transitions. If an OPEN_ACCEPT is received, a SAS Phy connection has been established so the SPCM requests transition to an Active state. If the PhyEAT>PhyCT or some other connection error occurs (e.g. timeout), the SPCM aborts the connection request and requests transition back to the Idle State S2.

Further referring to FIG. 6, a disconnecting state, S6, 606 is provided. The disconnecting state is the phy state where the SPCM is actively disconnecting from an initiator (e.g. exchanging DONE and CLOSE primitives). The SPCM monitors the phy disconnection process. The SPCM manages the state transition. Once the SAS connection is closed, the SPCM requests transition to the idle state, S2, 602.

An active state, S4, 604 is also provided. This is the phy state where host data transfers are allowed. The SPCM monitors persistent connection requests from an initiator (e.g. EXTEND_CONNECTION). The SPCM also monitors the next PhyEAT. The next PhyEAT is determined for the next command scheduled to use this phy from the SAS phy DMA scheduler. The SPCM may also monitor the next initiator to connect with the phy from the SAS phy DMA scheduler. In embodiments, the SPCM also monitors the PhyICT. The PhyICT is an optimal time when the SPCM should initiate a request to establish a connection such that the phy is in an active state when it is needed for host data transfer (e.g. PhyICT=PhyEAT-PhyCT where any negative result is set to 0).

The SPCM, for active state, S4, 604 manages transitions according to a predefined order. First, if the host requests a persistent connection and the next command is from the currently connected initiator, the SPCM transitions to an active persistent connection state S5, 605. If the host requests a persistent connection and the next command is from an initiator different than the currently connected initiator and the (Next PhyEAT-PhyICT)>Minimum Persistent Connection Time, SPCM transitions to Active persistent connection stated S5, 605. If the current host data transfer completes and the next command is from the currently connected initiator and the Next PhyEAT<Done Delay threshold (e.g. 1 ms), the SPCM withholds sending a DONE primitive and transitions to the disconnect delay state, S7, 607. If the current host data transfer completes and the next command is from a different initiator than the currently connected initiator and the speculative connection mode (SCM) is enabled, the SPCM withholds sending a DONE primitive and transitions to the disconnect delay state, S7, 607. In all other cases, the SPCM transitions to the disconnecting state, S6, 606.

Further referring to FIG. 6, an active persistent connection state, S5, 605 is illustrated. In this phy state, active persistent connection continues to be extended. The SPCM monitors persistent connection extension requests from an initiator (e.g. EXTEND_CONNECTION). The SPCM also monitors the next PhyEAT. A next PhyEAT may be determined for the next command scheduled to use this phy from the SAS phy DMA scheduler. The SPCM may also monitor, in this state, the next initiator to connect from the SAS phy DMA scheduler. The SPCM may also monitor phy disconnection time (phyDT). This is defined as the amount of time it takes to disconnect on the specific phy based on internal statistics from past connections.

In the active persistent connection state, S5, 605 the SPCM also monitors the phy connection time, PhyCT. This is defined as the amount of time it takes to establish a connection on this phy to the target initiator based on internal statistics from past connections and the current phy link usage. The SPCM also monitors the phyIDCT (phy initiate disconnect connect time). This is defined as the optimal time when the SPCM should initiate a request to disconnect to establish a new connection with a different initiator such that the phy is in an active state when it is needed for the next host data transfer (e.g. phy IDCT=PhyEAT-PhyDT-PhyCt where any negative result is set to 0).

In the active persistent connection state, S5, 605 the SPCM manages state transitions in the following order. First, if a Next command exists and is for a different initiator and PhyIDCT=0, the SPCM transitions to the disconnecting state, S6, 606 to ensure a connection is established with a new initiator before the host data transfer is scheduled to occur. If the speculative connection mode (SCM) is enabled and the host requests a disconnect and the PhyIDCT>Done Delay threshold (e.g. 1 ms), the SPCM transitions to the disconnect delay state, S7, 607 in the event that there is a change to the SAS Phy DMA scheduler that can take advantage of the current connection. If a Next command does not exist and this phy is part of a wide port and WPPPC is configured for aggressive power efficiency over performance (e.g. WPPPC>0xC0), SPCM transitions to a disconnecting state, S6, 606 to allow the SPPG to enable power management. If the Next command does not exist and this phy is part of a wide port with other active phys and WPPPC is configured for moderate power efficiency over performance (e.g. 0x40<WPPPC<0xC0), the SPCM transitions to the disconnecting state, S6, 606 to allow the SPPG to enable power management. If the Next command does not exist and this phy is part of the wide port with other phys that have an existing persistent connection to this same initiator and WPPPC is configured for aggressive performance, (e.g. WPPPC<0x40), SPCM transitions to disconnecting state, S6, 606 to allow the SPPG to enable power management. For all other cases, SPSM does not request a state transition and allows the phy to remain in the active persistent connection state, S5, 605.

Further regarding FIG. 6, a disconnect delay state, S7, 607 is provided. The disconnect delay state, S7, 607 is a phy state where a host has sent a DONE primitive but the drive withholds sending the DONE primitive in the event that the device can use the half-duplex connection before a done delay threshold (e.g. 1 ms) is exceeded. The SPCM, in this disconnect delay state, S7, 607 monitors a next PhyEAT, wherein the next PhyEAT is determined for the next command scheduled to use this phy from the SAS Phy DMA scheduler. The SPCM may also monitor the next initiator to connect with this phy from the SAS phy DMA Scheduler. The SPCM further monitors the PhyDT (Phy Disconnection Time). The PhyDT is defined as the amount of time it takes to disconnect on this phy based on internal statistics from past connections. The SPCM may also monitor the phyCT (Phy connection time), defined as the amount of time it takes to establish a connection on this phy to the target initiator based on internal statistics from past connections and current link usage. The SPCM may also be configured to monitor phyIDCT (phy initiate disconnect connect time), which is defined as the optimal time when the SPCM should initiate a request to disconnect to establish a new connection with a different initiator such that the phy is in an active state when it is needed for the next host data transfer (e.g. PhyIDCT=PhyEAT-PhyDT-PhyCT). The SPCM also monitors the time since the initiator sent a done primitive.

The SPCM manages state transitions in the following order. If the PhyIDCT=0, then then SPCM transitions to a disconnecting state, S6, 606 to ensure a connection is established with the initiator before the host data transfer is scheduled to occur. If the time since the Initiator transmitted a DONE primitive approaches the done delay threshold (e.g. 1 ms) the SPCM transitions to a disconnecting state, S6, 606 to ensure the connection is properly closed within the SAS specified time limits. For all other cases, SPSM does not request a state transition and allows the phy to remain in the disconnect delay state, S7, 607.

Figure 7:
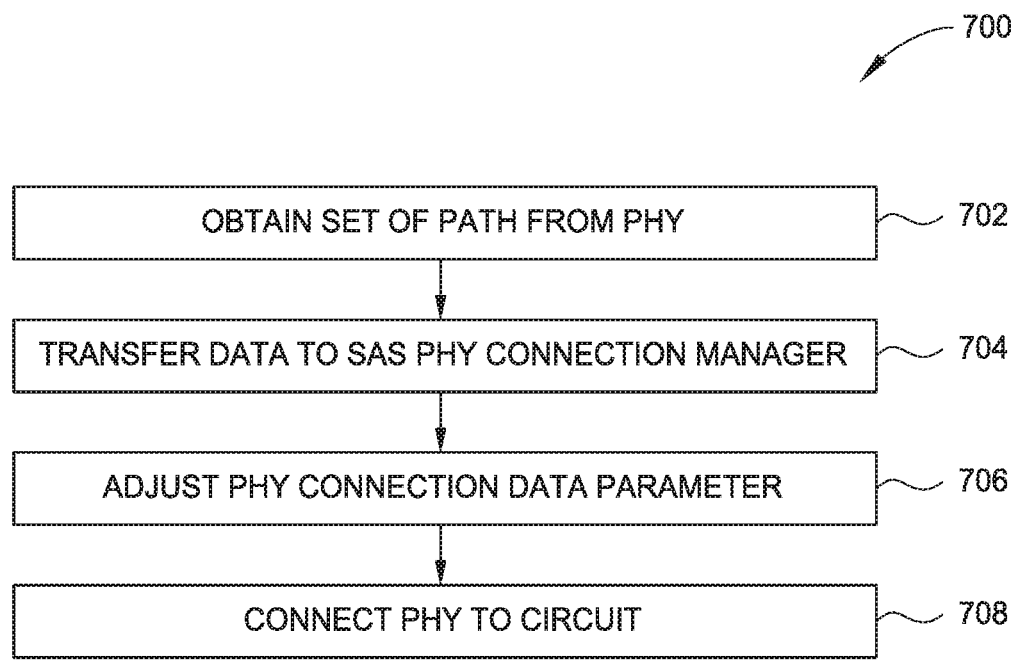
FIG. 7 is a diagram of a method in conformance of one example embodiment.

Referring to FIG. 7, a method for intelligent SAS phy connection management is illustrated. The method 700 for operating at least one phy connection in a memory arrangement, comprises obtaining at least one set of data from the at least one phy connection 702, transmitting the at least one set of data from the at least one phy connection to a SAS phy connection manager 704, adjusting at least one phy connection parameter with the SAS phy connection manager 706 and connecting the at least one phy connection to an electrical circuit using the at least one phy connection parameter adjusted by the SAS phy connection manager 708.

The methods and apparatus disclosed provide a solid state drive that allows for monitoring of states, wherein the monitoring of states is performed internally to the solid state drive. Such internal monitoring allows for predictive analysis to be conducted, without the need for an interface with a host computer. Such a configuration and method of operation allows for advantageous operations to be conducted compared to conventional systems and methods. Individual users may detail what type of performance they desire, such as if speedy performance is needed or if power saving capabilities are needed. Conventional systems do not provide such a capability.

A user may also fine tune the operations of the solid state drive on a state-by-state basis thereby allowing differing combinations to be made. Such custom ability to fine tune not only overall performance, but also individual states of the solid state drive allows for configurations and methods of operation previously unachievable.

In one non-limiting embodiment, an arrangement for phy connection management is disclosed comprising: at least one phy connection configured to be connected to an electrical circuit and transmit and receive data from the at least one phy connection, a SAS phy connection manager connected to each of the at least one phy connections, wherein the SAS phy connection manager is configured to control a connection of the at least one phy connection to the electrical circuit and wherein the SAS phy connection manager is configured to capture data related to initiator requests, a direct memory access multiplexer connected to the at least one phy connection to transmit and receive data and a direct memory access engine queue connected to the direct memory access multiplexer.

In another non-limiting embodiment, the arrangement may be configured wherein the at least one phy connection is four phy connections.

In another non-limiting embodiment, the arrangement may further comprise a SAS phy DMA scheduler connected to the DMA engine queue and the SAS phy connection manager, wherein the SAS DMA scheduler is configured to schedule operations of a SAS phy.

In another non-limiting embodiment, the arrangement may further comprise a SAS phy power governor connected to the SAS phy connection manager.

In another non-limiting embodiment, the arrangement may further comprise a command statistics performance monitor connected to the SAS phy power governor, the SAS phy connection manager and the SAS phy direct memory access scheduler.

In another non-limiting embodiment, the arrangement may be configured wherein the SAS phy power governor is further configured to be connected to each of the at least one phy connections.

In another non-limiting embodiment, the arrangement may further comprise at least one media subsystem.

In another non-limiting embodiment, the arrangement may be configured wherein the at least one media subsystem is a memory buffer.

In another non-limiting embodiment, the arrangement may be configured wherein the at least one media subsystem is a data state machine.

In another non-limiting embodiment, the arrangement may be configured wherein the SAS phy connection manager is configured to predict a host phy usage.

In another non-limiting embodiment, the arrangement may be configured wherein the SAS phy connection manager is configured to predict a device phy usage.

In another non-limiting embodiment, the arrangement may be configured wherein the SAS phy connection manager is configured to set a time when a next phy will be used by a host.

In another non-limiting embodiment, the arrangement may be configured wherein the arrangement is configured to make connection decisions to the at least one phy based upon the initiator requests.

In another non-limiting embodiment, the arrangement may be configured wherein the arrangement is configured to make connection decisions to the at least one phy based upon a prediction of an initiator response time.

In another non-limiting embodiment, the arrangement may further comprise a wide port performance power control connected to the SAS phy connection manager, wherein the wide port performance power control is configured to make connection decisions to the at least one phy based upon at least one of performance and power data of the arrangement.

In another non-limiting embodiment, the arrangement may be further configured wherein the arrangement is configured to adjust connections based on at least one of performance and power preferences of a user.

In another non-limiting embodiment, a method for operating at least one phy connection in a memory arrangement is disclosed comprising: obtaining at least one set of data from the at least one phy connection, transmitting the at least one set of data from the at least one phy connection to a SAS phy connection manager, adjusting at least one phy connection parameter with the SAS phy connection manager and connecting the at least one phy connection to an electrical circuit using the at least one phy connection parameter adjusted by the SAS phy connection manager.

In another non-limiting embodiment, the method for operating the at least one phy connection, wherein the adjusting of the at least one phy connection parameter is based on a power parameter.

In another non-limiting embodiment, the method for operating the at least one phy connection, wherein the adjusting of the at least one phy connection parameter is based on a performance parameter.

In another non-limiting embodiment, the method for operating the at least one phy connection may further comprise reading data from a mode control page to obtain operating parameters for the one phy connection.

In another non-limiting embodiment, the method for operating the at least one phy connection is performed wherein the operating parameters are a minimum persistent connection time, a speculative connection extension and a done delay threshold to modify SAS phy connection manager operating parameters.

In another non-limiting embodiment, the method for operating the at least one phy connection, may further comprise logging initiator connection statistics from the SAS phy connection manager.

In another non-limiting embodiment, the method for operating the at least one phy connection, may further comprise adjusting a power state of the memory arrangement based upon a user power preference.

In another non-limiting embodiment, the method for operating the at least one phy connection may further comprise obtaining an input on power control from a user, transmitting the input on the power control from the user to a wide port performance power control and exporting data from the wide port performance power control to the SAS phy connection manager wherein the SAS phy connection manager is operated according to the input.

In another non-limiting embodiment, an arrangement for intelligent SAS phy connection management is disclosed comprising: means for obtaining at least one set of data from the at least one phy connection, means for transmitting the at least one set of data from the at least one phy connection to a SAS phy connection manager and means for adjusting at least one phy connection parameter with the SAS phy connection manager.

In another non-limiting embodiment, the arrangement may further comprise means for connecting the at least one phy connection to an electrical circuit using the at least one phy connection parameter adjusted by the SAS phy connection manager.

In another non-limiting embodiment, the arrangement may further comprise at least one means for controlling a power to the at least one phy connection.

In another non-limiting embodiment, a method for operating a phy connection in a memory arrangement is disclosed comprising: obtaining data from the phy connection, transmitting the data from the phy connection to a SAS phy connection manager, determining operating parameters for the phy connection, adjusting at least one phy connection operating parameter with the SAS phy connection manager; and connecting the phy connection to an electrical circuit using the at least one phy connection operating parameter adjusted by the SAS phy connection manager.

In another non-limiting embodiment, an apparatus for operating a SAS phy connection in a solid state drive is disclosed comprising: means for measuring operating parameters of the SAS phy connection, means for obtaining data from the at least one phy connection; means for managing connection parameters of SAS phy connections; and means for transmitting the data from the SAS phy connection to the means for managing SAS phy connections.

In another non-limiting embodiment, a method of operating a SAS phy connection in a solid state drive is disclosed comprising obtaining data from the phy connection, transmitting the data from the phy connection to a SAS phy connection manager wherein the data contains data related to a request to extend a persistent phy connection, evaluating, with the SAS phy connection manager, whether a persistent phy connection is to be established for the solid state drive and extending a persistent phy connection based upon the SAS phy connection manager evaluation.

In another non-limiting embodiment, a method of operating a SAS phy connection in a solid state drive is disclosed comprising: obtaining data from at least two phy connections, transmitting the data from the phy connection to the SAS phy connection manager wherein the data contains data related to a request to extend a persistent phy connection, evaluating, with the SAS phy connection manager, whether the persistent phy connection is to be established to at least one of the at least two phy connections and extending the persistent phy connection based upon the SAS phy connection manager evaluation.

In another non-limiting embodiment, the method may be performed wherein the evaluating whether the persistent phy connection is to be established to at least one of the at least two phy connections is done through evaluating at least one of a power usage and a performance metric of the solid state drive.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method for operating at least one phy connection in a memory arrangement, comprising:
    obtaining at least one set of data from the at least one phy connection;
    transmitting the at least one set of data from the at least one phy connection to a SAS phy connection manager;
    adjusting at least one phy connection parameter with the SAS phy connection manager, wherein the adjusting is based on at least one of phy usage queues, phy power state transitions, and initiator connection statistics; and
    connecting the at least one phy connection to an electrical circuit using the at least one phy connection parameter adjusted by the SAS phy connection manager.

2. The method for operating the at least one phy connection according to claim 1, wherein the adjusting of the at least one phy connection parameter is based on a power parameter.

3. The method for operating the at least one phy connection according to claim 1, wherein the adjusting of the at least one phy connection parameter is based on a performance parameter.

4. The method for operating the at least one phy connection according to claim 1, further comprising:
    reading data from a mode control page to obtain operating parameters for the one phy connection.

5. The method for operating the at least one phy connection according to claim 1, wherein the operating parameters are a minimum persistent connection time, a speculative connection extension and a done delay threshold to modify SAS phy connection manager operating parameters.

6. The method for operating the at least one phy connection according to claim 1, further comprising:
    logging initiator connection statistics from the SAS phy connection manager.

7. The method for operating the at least one phy connection according to claim 1, further comprising:
    adjusting a power state of the memory arrangement based upon a user power preference.

8. The method for operating the at least one phy connection according to claim 1, further comprising:
    obtaining an input on power control from a user;
    transmitting the input on the power control from the user to a wide port performance power control; and
    exporting data from the wide port performance power control to the SAS phy connection manager wherein the SAS phy connection manager is operated according to the input.

9. An arrangement for intelligent SAS phy connection management, comprising:
    means for obtaining at least one set of data from the at least one phy connection;
    means for transmitting the at least one set of data from the at least one phy connection to a SAS phy connection manager; and
    means for adjusting at least one phy connection parameter with the SAS phy connection manager, wherein the adjusting is based on at least one of phy usage queues, phy power state transition, and initiator connection statistics.

10. The arrangement according to claim 9, further comprising:
    means for connecting the at least one phy connection to an electrical circuit using the at least one phy connection parameter adjusted by the SAS phy connection manager.

11. The arrangement according to claim 9, further comprising:
    at least one means for controlling a power to the at least one phy connection.

12. A method for operating a phy connection in a memory arrangement, comprising:
    obtaining data from the phy connection;
    transmitting the data from the phy connection to a SAS phy connection manager;
    determining operating parameters for the phy connection;
    adjusting at least one phy connection operating parameter with the SAS phy connection manager, wherein the adjusting is based on at least one of phy usage queues, phy power state transition, and initiator connection statistics; and
    connecting the phy connection to an electrical circuit using the at least one phy connection operating parameter adjusted by the SAS phy connection manager.

13. An apparatus for operating a SAS phy connection in a solid state drive, comprising:
- means for measuring operating parameters of the SAS phy connection;
- means for obtaining data from the at least one phy connection;
- means for managing connection parameters of SAS phy connections, wherein the managing is based on at least one of phy usage queues, phy power state transitions, and initiator connection statistics; and
- means for transmitting the data from the SAS phy connection to the means for managing SAS phy connections.

14. The apparatus of claim 13, further comprising means to capture data related to initiator requests.

15. The apparatus of claim 14, further comprising means to capture connection performance statistics.

16. The apparatus of claim 15, further comprising means to analyze the connection performance statistics.

17. The apparatus of claim 15, wherein the means to capture data related to initiator requests, the means to capture connection performance statistics, and the means to analyze the connection performance statistics operate without a host device management.

18. A method of operating a SAS phy connection in a solid state drive, comprising:
- obtaining data from the phy connection;
- transmitting the data from the phy connection to a SAS phy connection manager, wherein the data contains data related to a request to extend a persistent phy connection;
- evaluating, with the SAS phy connection manager, whether a persistent phy connection is to be established for the solid state drive, wherein the SAS phy connection manager evaluation comprises adjusting the SAS phy connection based on at least one of phy usage queues, phy power state transitions, and initiator connection statistics; and
- extending a persistent phy connection based upon the SAS phy connection manager evaluation.

19. A method of operating a SAS phy connection in a solid state drive, comprising:
- obtaining data from at least two phy connections;
- transmitting the data from the phy connection to the SAS phy connection manager, wherein the data contains data related to a request to extend a persistent phy connection;
- evaluating, with the SAS phy connection manager, whether the persistent phy connection is to be established to at least one of the at least two phy connections, wherein the SAS phy connection manager evaluation comprises adjusting the SAS phy connection based on at least one of phy usage queues, phy power state transitions, and initiator connection statistics; and
- extending the persistent phy connection based upon the SAS phy connection manager evaluation.

20. The method according to claim 19, wherein the evaluating whether the persistent phy connection is to be established to at least one of the at least two phy connections is done through evaluating at least one of a power usage and a performance metric of the solid state drive.

* * * * *